Feb. 22, 1944.  F. O. HICKLING  2,342,340
METHOD OF MAKING ROLLER BEARING CAGES
Filed Aug. 4, 1941
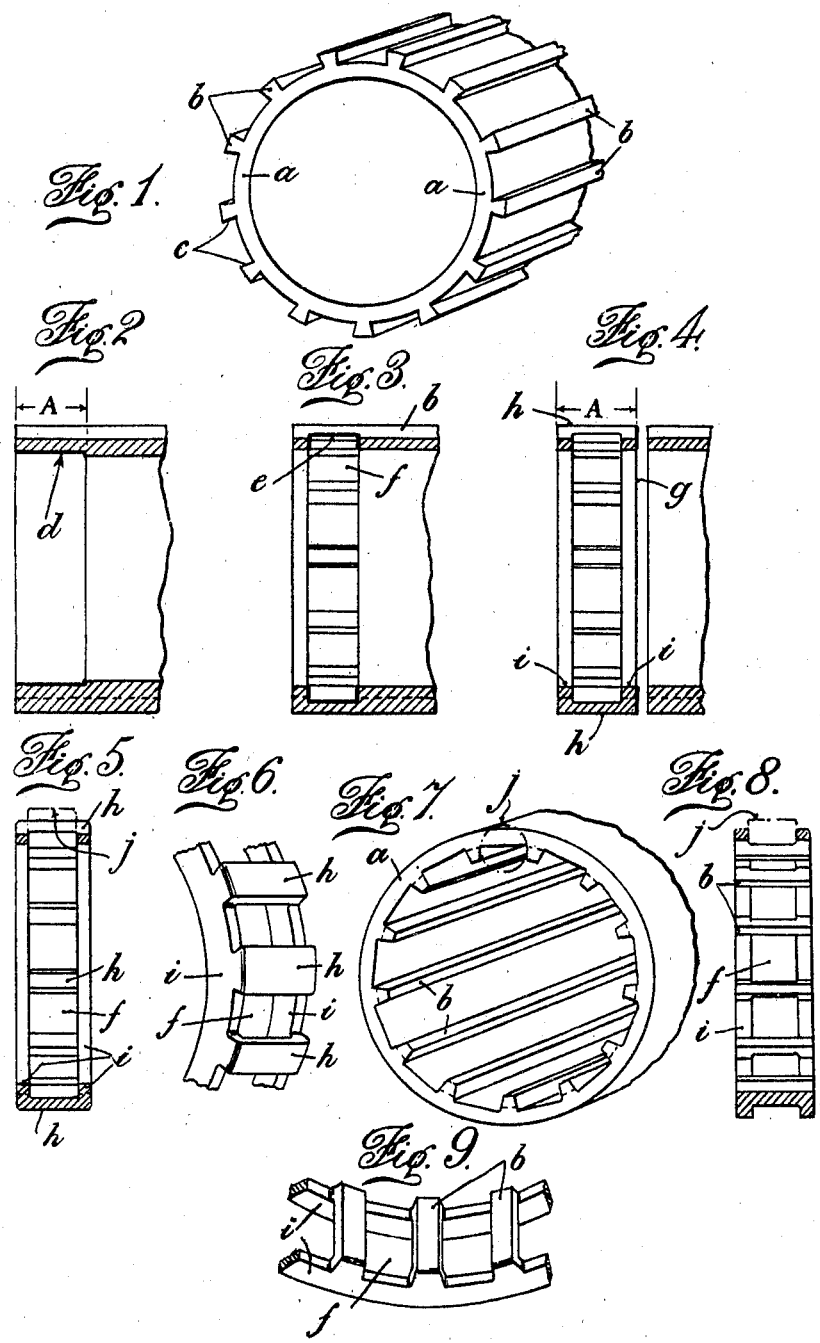
INVENTOR
Frederick O. Hickling
BY
ATTORNEY Patented Feb. 22, 1944

2,342,340

UNITED STATES PATENT OFFICE 2,342,340

METHOD OF MAKING ROLLER-BEARING CAGES

Frederick Osgood Hickling, West Bridgford, England, assignor to Ransome and Marles Bearing Company Limited, Stanley Works, Newark-on-Trent, England, a British company Application August 4, 1941, Serial No. 405,386
In Great Britain August 23, 1940

4 Claims. (Cl. 29—148.4)

This invention relates to an improved method of manufacturing cages for use in roller bearings and particularly to improvements in the manufacture of one piece cages comprising a series of longitudinally arranged spacing bars integrally connected at each end by inner or outer disposed ring-like members to provide apertures of square or rectangular shape between the spacing bars and the ring-like members for the reception of cylindrical rollers, the slots between the spacing bars extending the full length of the cage. Heretofore the method of constructing this cage consisted in forming a cylindrical sleeve of substantially U shape in longitudinal section and cutting away at intervals the material between the flanges of the U shaped sleeve for the whole length of the sleeve so as to leave a series of spacing bars connected at their ends by ring-like members, thus providing slots for the reception of rollers, the said cutting operation being performed either by a milling, hobbing, slotting or broaching operation.

The object of the present invention is to provide an improved method of manufacture which will simplify the construction so as to obtain cheaper and quicker production.

A further object is to eliminate the cutting away of the material to provide the spacing bars so that waste of material by such cutting operations will be avoided.

With these and other objects in view the invention consists in extruding a tube of material with inner or outer longitudinally arranged ribs and forming from said tube a cylindrical sleeve of substantially U-shape in longitudinal section so as to provide slots for the reception of rollers.

The invention further consists in extruding a tube with outer longitudinal ribs of tapered shape in cross section, turning a bore in the said tube then forming a recess in the bore and parting off so as to form a cage of U-shape in longitudinal section, the recess being of a diameter slightly in excess of the thickness of the tube, whereby to provide slots for the reception of the rollers.

The invention still further consists in extruding a tube with inner longitudinal ribs of tapered shape in cross section, turning a circumferential groove or recess in the tube of slightly greater depth than the thickness of the tube, then parting off so as to provide a cage consisting of a number of circumferentially arranged spacing bars connected at each end by a ring disposed outwardly of the bars.

The invention will now be described with reference to the accompanying drawing, in which:

Figure 1 is a perspective view of a tube extruded with longitudinal ribs according to one form of this invention.

Figure 2 is a longitudinal section of part of a tube showing a portion of the bore turned;

Figure 3 is a similar view showing the formation of a recess;

Figure 4 is a further longitudinal section showing a cage parted off from the tube;

Figure 5 is a section through the cage;

Figure 6 is a part perspective view of the cage;

Figure 7 is a similar view to Figure 1 showing a modified form of tube, and

Figures 8 and 9 show similar views to Figures 5 and 6 respectively of a modified form of cage made from the tube shown in Figure 7.

As shown in Figure 1, a tube $a$ is extruded with a plurality of longitudinal ribs $b$ having tapered sides $c$. These ribs $b$ which are formed on the outer periphery of the tube $a$ have the adjacent faces $c$ of each pair of ribs $b$ in parallel alignment and are adapted to provide spacing bars for the rollers in the manner to be hereinafter described. The method of forming cages from the tube $a$ consists in first facing as indicated at $d$ in any suitable manner the interior periphery of the tube as shown in Figure 2 and then machining a recess $e$ in the tube as shown in Figure 3. This recess $e$ is formed by cutting away the interior of the tube $a$ to a diameter slightly in excess of the outer diameter of the tube $e$ so as to provide slots $f$ between the ribs $b$. The next operation consists in parting off a certain length of the tube as shown at $g$ in Figure 4, so that a cage will be formed consisting of a plurality of longitudinally arranged spacing bars $h$ connected at each end to internally arranged rings $i$. The cage may be of any convenient length as to permit of the insertion of one or more rollers $j$ in each hole or space $f$ between the spacing bars $h$, the said roller or rollers $j$ being guided at each end by the inwardly arranged rings $i$. A longitudinal sectional elevation of a completed cage is shown in Figure 5 and a portion of the cage is shown in Figure 6. In the above construction a bridge-like cage is provided and the supporting rings $i$ are arranged inwardly at each end of the cage; but obviously these rings $i$ may be arranged outwardly at each end of the cage by forming a recess on the outer diameter of a sleeve formed from a tube extruded with inwardly arranged longitudinal ribs. A diagram of such an extruded tube is shown in Figure 7.

In this modification the ribs $b$ of the tube $a$ are inwardly tapered so that the opposed walls of each pair of ribs are in parallel alignment. In constructing this form of cage the outer diameter of the tube $a$ is faced and a recess is turned on the said outer diameter. The diameter of the base of the recess is slightly less than the main interior diameter of the tube $a$ so that the forming of the recess provides slots $i$ between the spacing bars $h$. When the sleeve is parted off from the tube a cage is formed with the end rings $i$ arranged externally of the spacing bars $h$.

It will be seen that the spacing bars $h$ in both of the above constructions extend the full length of the cage and the slots $f$ between the bars $h$ extend the full length of the cage. Thus in end elevation the cage is in the form of a ring having either outwardly or inwardly radially arranged projections formed by the ends of the spacing bars $h$. Obviously the spacing bars may be of any convenient shape in cross section. For instance, they may be of taper form so as to converge on the centre of the cage itself or any other suitable angle. Cages constructed from extruded tube as above described will be cheap to produce owing to the small amount of machining and the minimum cutting away of waste material. Further cages can be formed of any length to take any number of rollers which will be retained in true parallel alignment by the spacing bars. Any suitable means may be provided to retain the rollers within the cage. Cages of the shape above described can be readily lubricated as they are of squirrel cage form and it is obvious that the lubricant is readily obtained on the portion of the cage and bearings where vitally necessary. Thus the cage will have long lasting qualities and permit of high speeds.

What I claim is:

1. A method of forming roller bearing cages, consisting in forming a tube with longitudinal spaced ribs on one surface, the other surface being substantially plain, cutting the tube transversely from the plain surface for the full circumferential length of the tube with the cut extending into but not extending through the ribs, and completely severing the tube and ribs on transverse lines beyond the margin of the initial cut.

2. A method as defined in claim 1, wherein the ribs are formed on the outer surface of the tube, and wherein the inner surface of the tube is substantially plain.

3. A method as defined in claim 1, wherein the ribs are formed on the inner side of the tube, and wherein the outer surface is substantially plain.

4. A method of forming roller bearing cages, consisting in extruding a tube to provide on one surface longitudinal parallel ribs spaced apart in accordance with the diameter of the rollers to be used, the opposite surface of the tube being plain, and cutting from the plain surface completely through the tube and partially only through the ribs, the line of cut being transverse the tube and including all ribs and having a width slightly exceeding the length of the rollers to be used, and then completely severing the tube and ribs on lines spaced from but parallel to the first line of cut.

FREDERICK OSGOOD HICKLING.